(12) United States Patent
Janmey

(10) Patent No.: US 7,816,026 B2
(45) Date of Patent: Oct. 19, 2010

(54) BATTERY HAVING AIR ELECTRODE AND BIASED LEVER GASKET

(75) Inventor: Robert M. Janmey, Columbia Station, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1062 days.

(21) Appl. No.: 11/525,261

(22) Filed: Sep. 22, 2006

(65) Prior Publication Data

US 2008/0075995 A1 Mar. 27, 2008

(51) Int. Cl.
*H01M 12/06* (2006.01)
*H01M 2/08* (2006.01)

(52) U.S. Cl. ......................................... 429/27; 429/185

(58) Field of Classification Search .................... 429/27, 429/185
See application file for complete search history.

(56) References Cited

U.S. PATENT DOCUMENTS

| 4,118,544 | A | | 10/1978 | Przybyla et al. |
| 4,343,869 | A | | 8/1982 | Oltman et al. |
| 4,557,983 | A | * | 12/1985 | Sauer ........................... 429/27 |
| 5,451,473 | A | | 9/1995 | Oltman et al. |
| 5,576,117 | A | | 11/1996 | Morita et al. |
| 5,587,259 | A | | 12/1996 | Dopp et al. |
| 5,843,597 | A | | 12/1998 | Getz |
| 6,051,337 | A | | 4/2000 | Heinz, Jr. |
| 6,358,645 | B1 | | 3/2002 | Furukawa et al. |
| 6,436,156 | B1 | | 8/2002 | Wandeloski et al. |
| 6,761,995 | B2 | | 7/2004 | Uyama et al. |
| 6,830,847 | B2 | | 12/2004 | Ramaswami et al. |
| 7,001,689 | B2 | | 2/2006 | Buckle |

FOREIGN PATENT DOCUMENTS

| DE | 3037447 A1 | 5/1982 |
| EP | 129881 B | 10/1986 |
| GB | 1178859 A | 1/1970 |

(Continued)

OTHER PUBLICATIONS

Patent Corporation Treaty (PCT), International Search Report and Written Opinion for Application No. PCT/US2007/020324, filed Sep. 19, 2007, mailed Mar. 6, 2008, European Patent Office, Netherlands.

*Primary Examiner*—Patrick Ryan
*Assistant Examiner*—Karie O'Neill Apicella
(74) *Attorney, Agent, or Firm*—Russell H. Toye, Jr.

(57) ABSTRACT

A fluid consuming battery and method are provided for reducing electrode doming and providing an adequate sealed closure to the battery housing. The battery includes a cell housing having first and second housing components and at least one fluid entry port through a side of the cell housing for the passage of a fluid. The battery also has a gasket disposed between the first and second housing components. A first electrode is disposed within the cell housing in electrical contact with the first housing component and a second air electrode is provided in an electrode assembly disposed within the cell housing in electrical contact with the second housing component. The electrode assembly includes a first peripheral portion that is pre-compressed relative to a middle portion. The gasket has first and second extensions that bias against interior surfaces, and the second extension is radially inwards of an angled outward recess in the can.

21 Claims, 6 Drawing Sheets

FOREIGN PATENT DOCUMENTS

| | | | |
|---|---|---|---|
| GB | 2109622 | A | 6/1983 |
| JP | 59-194361 | A | 11/1984 |
| JP | 02139875 | A | 5/1990 |
| JP | 2005-347104 | A | 12/2005 |
| WO | 9963605 | A | 12/1999 |
| WO | WO 00/36668 | | 6/2000 |

* cited by examiner

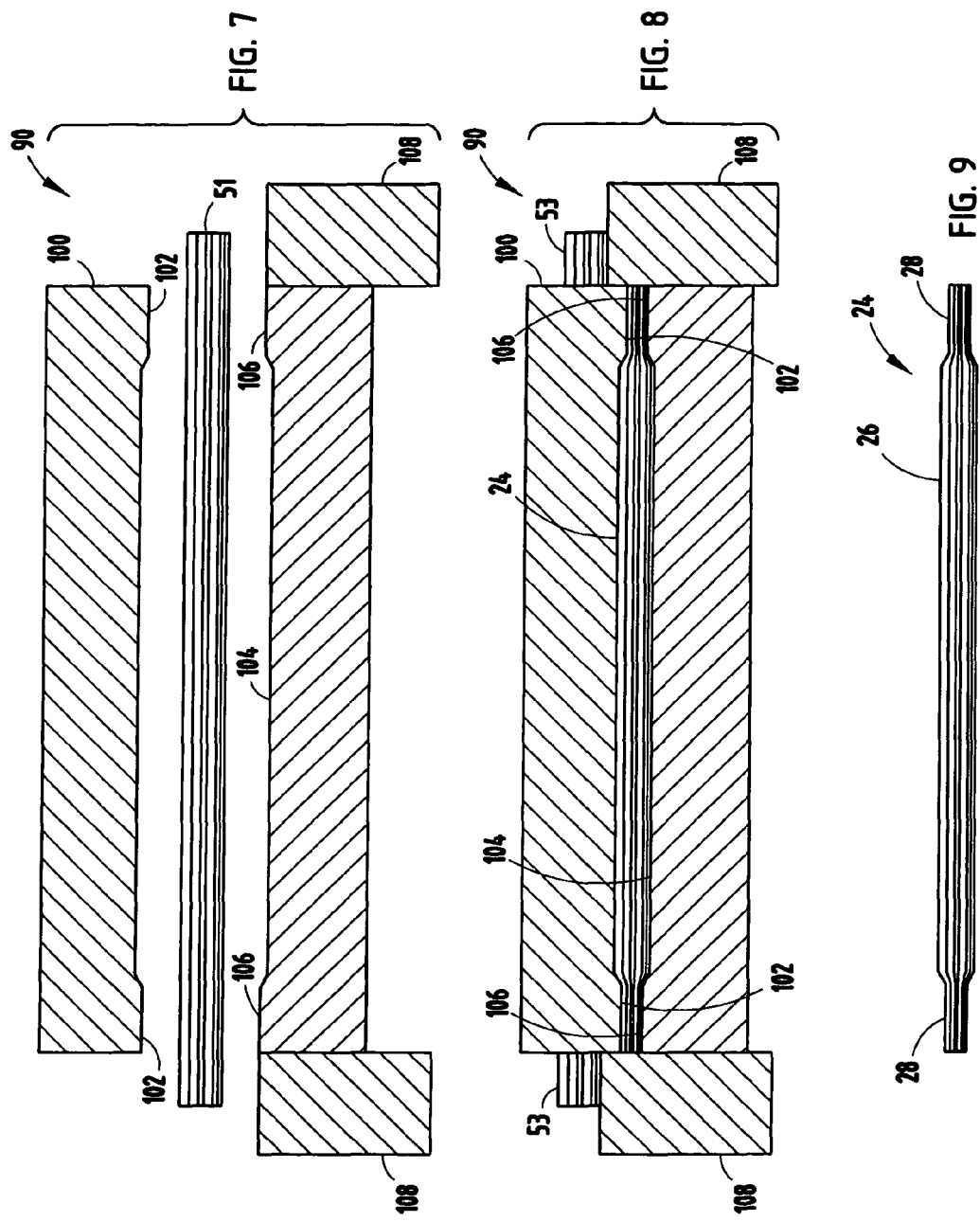

BATTERY HAVING AIR ELECTRODE AND BIASED LEVER GASKET

BACKGROUND OF THE INVENTION

The present invention generally relates to the sealed closure of electrochemical batteries, and more particularly relates to the sealed closure of battery cells having a fluid consuming electrode, such as air-depolarized cell batteries, to prevent or reduce cell leakage and doming of an electrode assembly.

Electrochemical battery cells that utilize a fluid, such as oxygen or other gases, from outside the cell as an active material to produce electrical energy, such as air-depolarized battery cells, can be used to power a variety of portable electronic devices. Zinc/air cells are commonly assembled in the form of button cells which have particular utility as batteries for electronic hearing aids and other electronic devices. The zinc/air button cell typically includes a cathode can and an anode cup or cover, which together form a cell housing. Disposed within the cell housing are positive and negative electrodes (cathode and anode, respectively), a separator and an aqueous electrolyte. In an air-depolarized cell, the positive electrode is a generally spongy, porous air electrode. A gasket is disposed between the first and second housing components to seal closed the cell housing. Openings are typically provided in the cell housing to allow atmospheric air, including oxygen, to enter the positive air electrode to serve as the cathode reactant.

In a zinc/air cell, the air electrode is typically provided as an electrode mix of carbon, polytetrafluoroethylene (PTFE) resin powder, manganese dioxide, and binder impressed into a current collector screen. A microporous layer, such as a microporous PTFE film, is usually adhered to the air intake side of the air electrode to allow air to enter the air electrode mix. The air electrode with current collector screen, microporous layer, and the separator are typically assembled together as an air electrode assembly, generally in the form of a laminated sheet. The air electrode assembly is inserted into the housing such that the peripheral edges of the electrode assembly are compressed along with the gasket between the housing components when the cell housing is crimped closed. The air electrode assembly is generally flexible and spongy and includes porous materials that compress along with the gasket to provide the sealed closure of the cell housing.

The conventional insulating gasket is generally a J-shaped gasket having an outer upstanding wall, a shorter inner upstanding wall, and an interconnecting bottom base wall. The outer upstanding wall of the gasket is typically compressed between side walls of the two housing components. The base wall of the gasket is typically compressed between the bottom edge of the side wall of the anode cup or cover and the air electrode assembly which, in turn, abuts the cathode can. The inner upstanding wall of the conventional J-shaped gasket extends into the internal volume of the cell housing such that it consumes volume within the battery and does not necessarily provide an optimal sealing engagement.

Conventional electrochemical cells employing porous electrode assemblies may suffer a number of drawbacks. For example, the crimped closure of the battery housing generally causes axial forces on the can and the gasket, which forces are transmitted to the interface of the gasket and the air electrode assembly. Since the air electrode assembly is generally manufactured with high porosity, the air electrode assembly is not a rigid structural member, and thus does not always provide a robust sealed closure. During the crimped closure of the battery housing, the air electrode assembly is compressed which typically causes doming of the air electrode assembly toward the anode that is an undesirable non-flat condition. Doming of the air electrode assembly generally results in a loss of otherwise usable internal volume within the battery cell, may result in cracking of the air electrode assembly, and may lead to electrolyte leakage from the battery cell.

It is therefore desirable to provide for a battery cell that optimizes the usable internal volume of the battery housing for active materials. In particular, it is desirable to provide for an air cell that minimizes doming of the air electrode assembly. Additionally, it is desirable to provide for a battery cell that further exhibits enhanced leakproofness to ensure adequate long-term shelf life of the battery cell.

SUMMARY OF THE INVENTION

In accordance with the teachings of the present invention, a battery is provided for providing an adequate sealed closure to the battery housing. According to one aspect of the present invention, a battery is provided that includes a cell housing comprising first and second housing components and a gasket disposed between the first and second housing components. The cell housing has at least one fluid entry port through a side of the cell housing for the passage of a fluid into the cell housing. The battery further includes a first electrode disposed within the cell housing in electrical contact with the first housing component, and an electrode assembly comprising a second, fluid consuming electrode disposed within the cell housing in electrical contact with the second housing component. The gasket includes an outer upstanding wall, a base wall, and first and second inner walls extending such that the first inner wall is in biased contact with the first housing component and the second inner wall is in biased contact with the electrode assembly.

According to another aspect of the present invention, a battery is provided that includes a cell housing having at least one fluid entry port through a side of the cell housing for the passage of a fluid into the cell housing. The cell housing includes a first housing component and a second housing component. A first electrode is disposed within the cell housing in electrical contact with the first housing component. An electrode assembly including a second, fluid consuming electrode is disposed within the cell housing in electrical contact with the second housing component. A gasket is disposed between the first and second housing components. The gasket includes an outer upstanding wall, a base wall and first and second inner extensions extending from the base wall and having terminal ends, wherein the first and second inner extending walls are compressed such that the first inner wall is in biased contact with the first housing component and the second inner wall is in biased contact with the electrode assembly.

According to one or more of the various aspects of the present invention, the battery advantageously achieves enhanced sealed closure of the cell housing. Additionally, the battery exhibits reduced doming of the electrode assembly which may otherwise consume usable volume within the battery.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 7 is an elevational side view of a press assembly machine for pre-compressing and cutting the air electrode assembly for use in the cell seen in FIG. 1;

FIG. 8 is an elevational side view of the press assembly machine further illustrating the compression and cutting of the air electrode assembly;

FIG. 9 is a side view of the pre-compressed air electrode assembly ready for insertion in the cell housing;

DETAILED DESCRIPTION OF THE PREFERRED EMBODIMENTS

Figure 1:
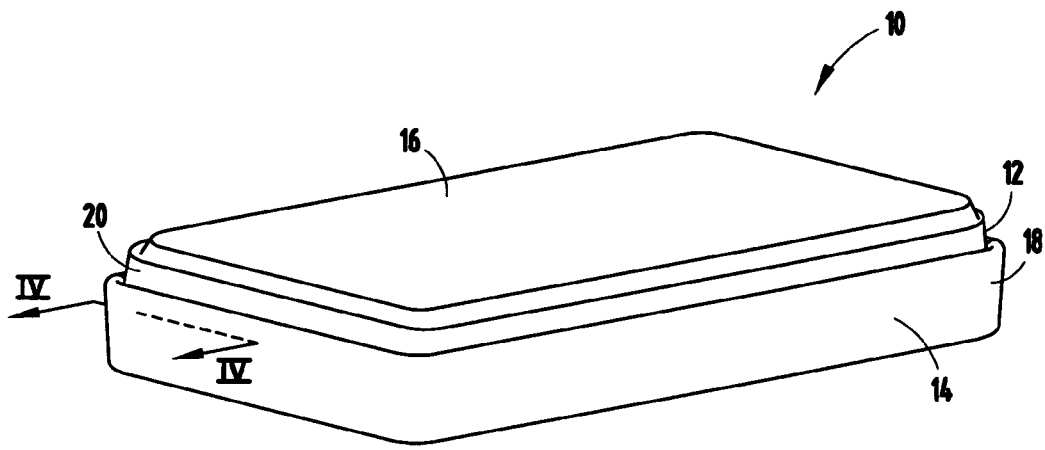
FIG. 1 is a perspective top side view of a prismatic air cell battery constructed according to a first embodiment of the present invention.
Figure 2:
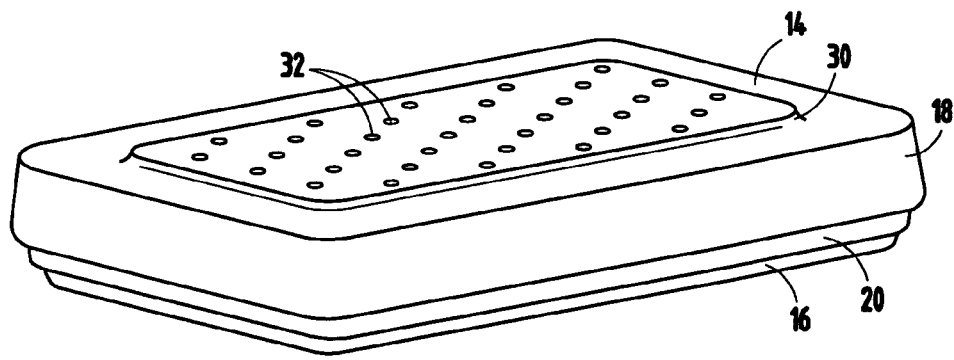
FIG. 2 is a perspective bottom side view of the prismatic battery seen in FIG. 1.
Figure 3:
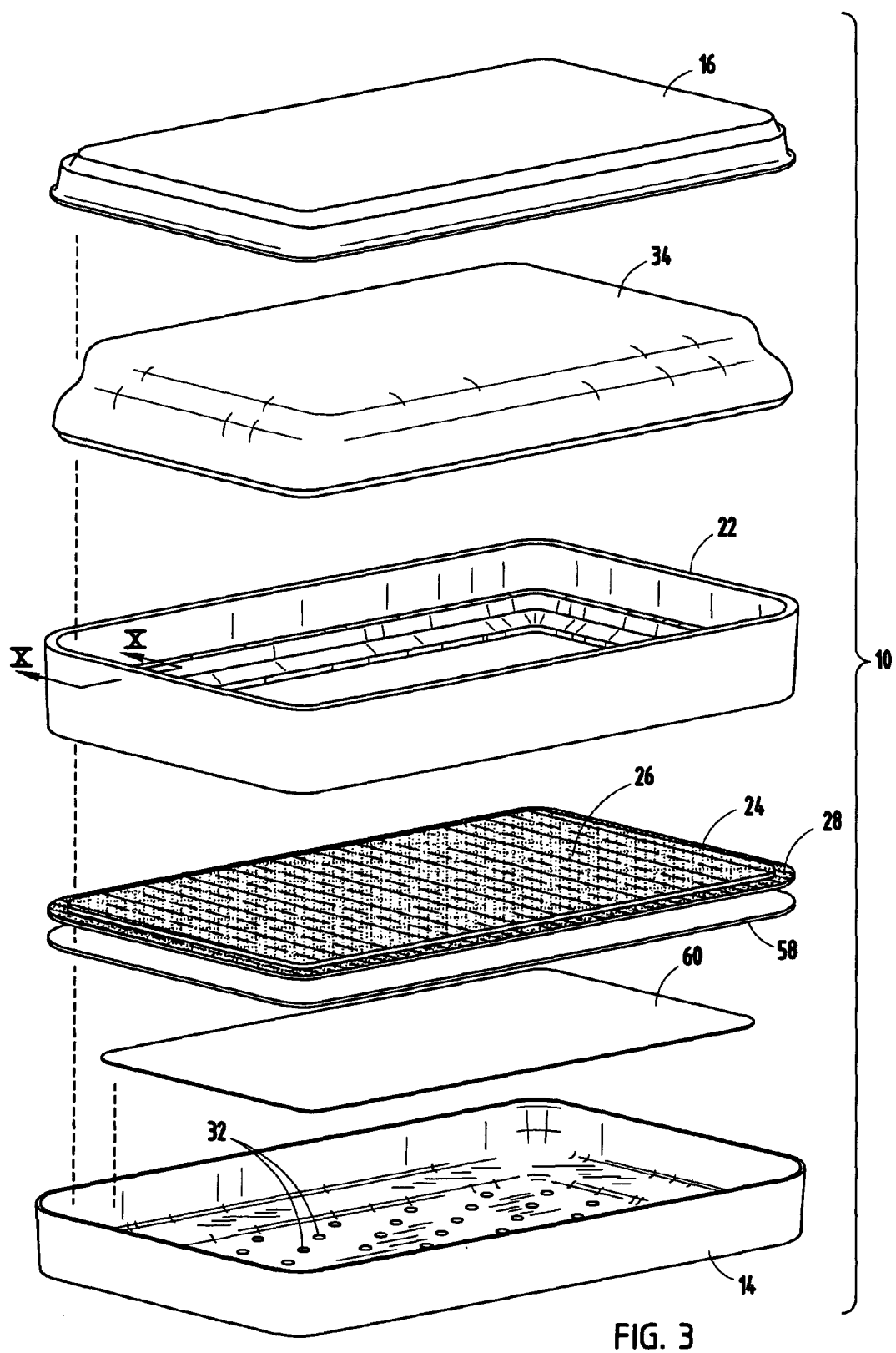
FIG. 3 is an exploded perspective view of the prismatic battery illustrated in FIG. 1.
Figure 4:
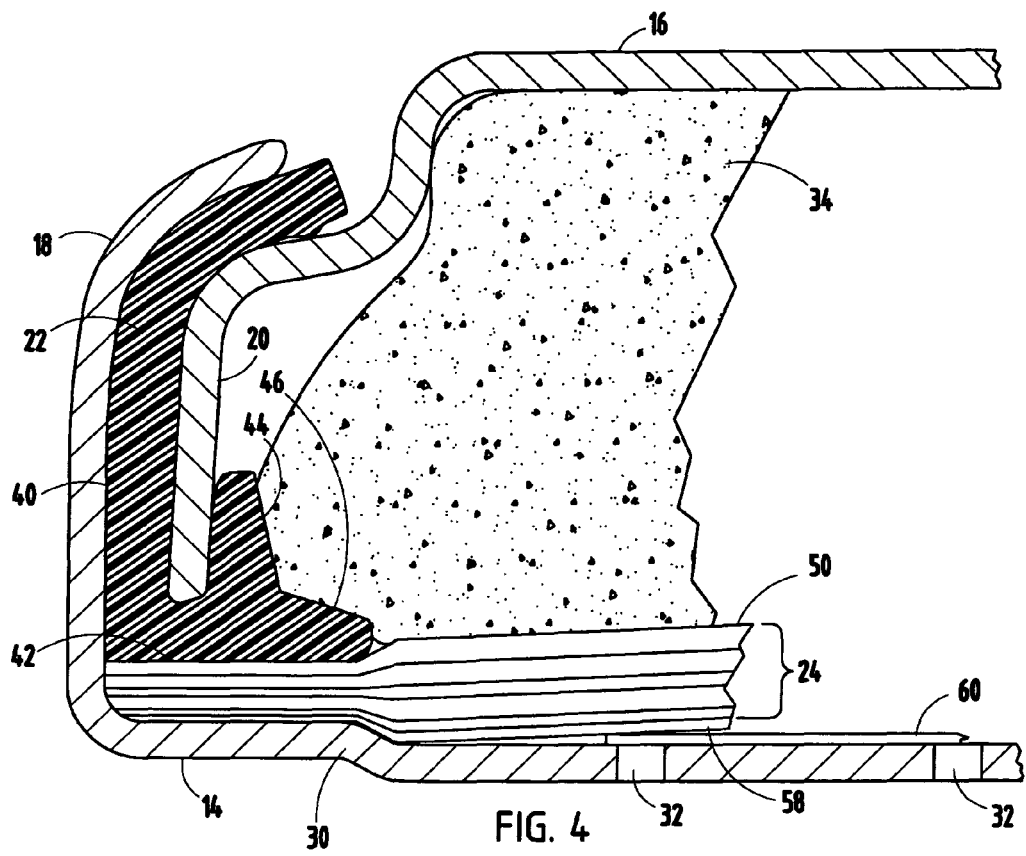
FIG. 4 is an enlarged cross-sectional view of the prismatic battery taken through line IV-IV of FIG. 1.

Embodiments of this invention include a battery that includes an electrochemical cell that utilizes a fluid (such as oxygen or another gas) from outside the cell as an active material for use in one of the electrodes. The battery cell has a fluid consuming electrode, such as an oxygen reduction electrode that uses a fluid (e.g., oxygen) received from outside the cell as an active electrochemical ingredient. The battery cell can be an air-depolarized cell or an air-assisted fluid utilizing cell. The present invention is exemplified below by an air-depolarized cell with an oxygen reduction electrode, but the invention can more generally be used in fluid consuming cells having other types of fluid consuming electrodes. Additionally, while the exemplary cell is illustrated as a prismatic cell having a substantially rectangular shape, the battery cell may be configured in other shapes and sizes such as a cylindrical or button shaped cell.

Referring now to FIGS. 1-4, an electrochemical fluid consuming battery cell 10 is shown constructed according to one embodiment of the present invention. As shown, the fluid consuming cell 10, which in this embodiment is an air-depolarized cell, includes a cell housing 12 that has a first housing component 16, referred to as the anode cup or cover, and a second housing component 14, referred to as the cathode can. The can 14 and cover 16 may be configured in other shapes and sizes differing from what would otherwise be considered a can or cover. For purposes of the disclosed example, the first housing component is hereinafter referred to as the cover 16, while the second housing component is hereinafter referred to as the can 14. The can 14 and cover 16 are both made of electrically conductive materials and are electrically insulated from one another by means of a gasket 22. The can 14 generally serves as the external positive contact terminal for the fluid consuming cell 10, whereas the cover 16 generally serves as the external negative contact terminal.

The can 14 includes a central outwardly recessed bottom surface, with a transition 30 between the peripheral and recessed central portions. A plurality of fluid entry ports (holes) 32 are formed in the bottom of the can 14 such that a fluid (atmospheric air including oxygen) may pass into the interior of the cell housing 12 to a fluid consuming electrode 52 which is assembled as a portion of an electrode assembly 24. It should be appreciated that one or more fluid entry ports 32 may be employed to allow sufficient fluid, containing cathode reactant (e.g., oxygen), to reach the fluid consuming electrode 52. Additionally, a fluid regulating system may be incorporated into or on the outside of the battery cell 10 to regulate the rate of entry of fluids into the battery cell 10.

Figure 6:
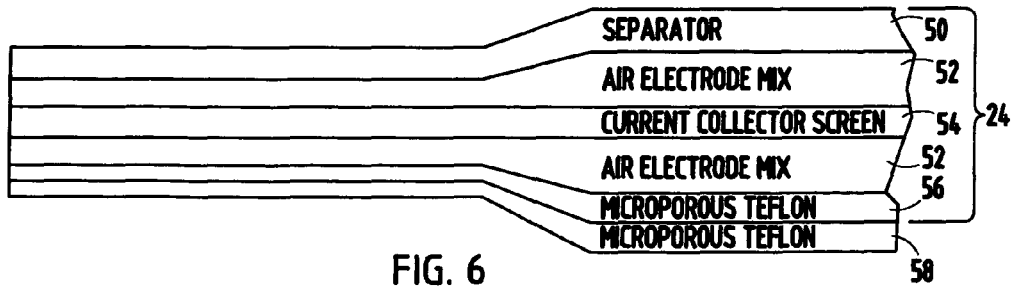
FIG. 6 is an enlarged cross-sectional view of the air electrode assembly and loose microporous layer taken through line VI-VI of FIG. 5.

Disposed within the cell housing 12 is a first electrode 34, also referred to as the negative electrode or anode. Also disposed in the cell housing 12 is the electrode assembly 24 which includes the second, fluid consuming, electrode 52 (FIG. 6). The second electrode 52 is also referred to herein as the positive electrode or cathode. A separator 50, which is also shown as part of the electrode assembly 24, is disposed between the first and second electrodes 34 and 52. The separator 50 acts as an ion conductor between the respective electrodes 34 and 52. The separator 50 also acts as an electrical insulator to prevent internal short-circuiting between electrodes 34 and 52. According to one embodiment, the separator 50 has two layers; however, one or more layers of separator material may be employed.

The first electrode 34 is preferably in electrical contact with the cover 16. According to one embodiment, the first electrode 34 is a zinc electrode having zinc as the active anode electrochemical material contained in the anode cup or cover 16. Electrode 34 may include zinc powder which is placed in the cup 16 and makes electrical contact with the anode cup or cover 16. According to one exemplary embodiment, the first electrode 34 includes a mixture of zinc particles, aqueous electrolyte and organic components such as binders which make up the negative electrode of the battery cell 10. The aqueous electrolyte may include an aqueous potassium hydroxide (KOH) solution, such as a thirty percent (30%) potassium hydroxide solution according to one example. The first electrode 34 may include other known materials for providing a negative electrode. In the disclosed embodiment, all of the active electrochemical materials of the negative electrode 34 are assembled and contained within the housing 12 at the time of cell assembly.

Disposed against the bottom surface of the first electrode 34 is the air electrode assembly 24 which includes the separator 50 adhered (e.g., glued) to the air electrode 52. The air electrode assembly 24 is shown formed as a laminated sheet that is assembled, compressed and cut, and then inserted into the cathode can 14 generally along the bottom inside surface. The air electrode assembly 24 includes peripheral regions or portions 28 that are compressed and thereafter disposed between a gasket 22 and the bottom peripheral inside surface of the can 14. The air electrode assembly 24 is further illustrated in FIGS. 5 and 6 having a generally prismatic or rectangular shape with rounded corners such that it fits within the likewise shaped can 14. In the embodiment shown and described herein, the air electrode assembly 24 is made up of the separator 50, air electrode 52, a current collector screen 54 disposed within the air electrode 52, and a layer of an air permeable, microporous material 56. The air electrode assembly 24 is generally formed as a laminated sheet made up of the various layers which allows for easy insertion and assembly into the electrochemical cell 10.

The air electrode 52 may be made of a cathode mix of carbon, catalyst, and binder, as is generally known in the art. According to one exemplary embodiment, the positive electrode mixture may employ carbon in the amount of about sixty percent (60%) to eighty percent (80%) of the total mix, a manganese oxide catalyst, in the amount of about three percent (3%) to twelve percent (12%) of the total mix, and a tetrafluoroethylene (TFE) binder in the amount of about five percent (5%) to forty percent (40%) of the total mix. According to another embodiment, the mix formula of the air electrode 52 employs ten percent (10%) to fifteen percent (15%) TFE binder. The current collector 54 may include a nickel exmet screen disposed within the air electrode 52 or embedded into one side of the positive electrode mix 54, preferably the side adjacent to the separator 50, and extending to the peripheral edge of the electrode assembly 24. The positive air electrode 52 is preferably in electrical contact with the can 14. Electrical contact can be made primarily through the current collector 54, preferably as a result of an interference fit between the outer edge of the electrode assembly 24 and the inside surface of the can side wall 18. The carbon is an activated carbon that acts as an active electrochemical material of the air electrode 52. Additionally, an outside fluid, such as oxygen, also acts as an active ingredient of the air electrode 52 that, catalyzed by the manganese oxide, reacts with water in the air electrode on the surface of the activated carbon. Accordingly, the air electrode 52 employs an active ingredient that is received from outside of the cell battery 10.

Disposed between the air electrode assembly 24 and the bottom inside surface of can 14 is an air distribution or diffusion layer 60. The air diffusion layer 60 may include a loose layer of highly porous material, such as a low density paper, which facilitates uniform distribution of air, particularly oxygen, entering openings 32 to the air electrode assembly 24, particularly to the air electrode 52. In the embodiment shown, the air diffusion layer 60 is not formed as part of the assembly 24 and does not extend within the compressed crimped closure region between the gasket 22 and the can 14.

The air electrode assembly 24 is a generally flexible, spongy, porous sheet made up of porous materials. The air electrode 52 is manufactured with high porosity to achieve enhanced electrochemical operation. The microporous layer 56 can be a PTFE film layer that is rather porous to allow for controlled passage of air. The microporous layer 56 is also hydrophobic so as to control the ingress and egress of liquid, particularly to repel aqueous electrolyte from passing through. Microporous layer 56 is pressure laminated to the bottom surface of air electrode 52, according to one embodiment.

Another air permeable, microporous layer 58 can be disposed in the cell 10 between the electrode assembly 24 and the can 14. According to one embodiment, microporous layer 58 can be a loose layer of PTFE film that rests below microporous layer 56 to provide an additional barrier to electrolyte leakage from the cell 10 if, for example, layer 56 is cracked or otherwise damaged.

The air electrode assembly 24 is generally configured as a laminated sheet that is pre-compressed in the peripheral region 28, prior to insertion in the cell housing 12. As used herein, a "pre-compressed" air electrode assembly 24 is one whose peripheral portion 28 is compressed after lamination of its components and before the electrode assembly 24 is inserted into the can 14. The air electrode assembly 24 has a substantial middle region or portion 26 that remains uncompressed relative to compressed peripheral portion 28. The uncompressed middle portion 26 remains spongy, flexible and porous, receives air (e.g., oxygen) entering openings 32, and is in ionic communication with the anode 34 through the separator 50. The peripheral compressed portion 28 is compressed in the peripheral region where the air electrode assembly 24 is to be disposed between the bottom base wall 42 of gasket 22 and the peripheral portion of the inner bottom surface of can 14. There can be a transition zone between the compressed peripheral portion 28 and the uncompressed central portion 26 in which the electrode assembly 24 is partially compressed to prevent damage to the electrode assembly.

The width of compressed portion 28 is selected so as to enhance the hoop strength of the air electrode assembly 24 such that the radial closing forces may be absorbed by the rigid pre-compressed portion 28 and not transmitted further inwards to the more porous uncompressed portion 26. As a consequence, doming of the air electrode assembly 24 is reduced. The size of the pre-compressed portion 28 of assembly 24 may be balanced between the increased leakproofness and any detrimental effects of electrode doming and reduced cell electrochemical function.

According to one embodiment, the compressed portion 28 of air electrode assembly 24 is compressed by at least twenty percent (20%) of the initial thickness, which is the thickness of uncompressed portion 26. According to one example of a PR48 battery cell having a general length of about 25 millimeters and a width of 7.5 millimeters, an air electrode assembly 24 is formed having a starting uncompressed height of approximately 0.381 millimeter (0.015 inch). Following precompression of peripheral portion 28, the uncompressed portion 26 of the air electrode assembly remains at a thickness of about 0.381 millimeter (0.015 inch), while the compressed portion is compressed to approximately 0.2921 millimeter (0.0115 inch). Accordingly, the compressed portion 28 is compressed by more than 0.0508 millimeter (0.002 inch), more specifically by about 0.0635 millimeter (0.0025 inch). It should be appreciated that to achieve a compressed thickness of approximately 0.02921 millimeter (0.00115 inch), the compressed portion may initially be compressed to approximately 0.2794 millimeter (0.0110 inch), as it may spring back by about 0.0127 millimeter (0.0005 inch), according to one example.

By pre-compressing the peripheral portion 28, the subsequent crimped closure in the housing 12 will result in energy going towards compressing the gasket 22, as opposed to applying significant energy towards compressing the air electrode assembly 24. This is because the pre-compressed portion 28 has the softness removed and is much stiffer. The pre-compressed portion 28 further impedes mobility of aqueous electrolyte which reduces access of the aqueous electrolyte to the perimeter, thus further reducing leakage of the battery cell 10. The compression of portion 28 results in compressing the void spaces in at least the porous electrode material 52 and the microporous layer 56, as well as some compression of the separator 50. It has also been discovered that, as a consequence of the pre-compression of compressed portion 28, a significant portion of compressibility of the air electrode assembly 24 is removed prior to its assembly into the battery cell housing 12 and the subsequent crimping closure of the housing 12, and the peripheral portion 28 will exhibit enhanced spring-like behavior, thereby providing a better axial seal in the sealed cell 10.

Figure 5:
FIG. 5 is a top view of the air electrode assembly (loose microporous layer not shown) employed in the prismatic battery of FIG. 1.

Referring to FIGS. 7-9, manufacture of the pre-compressed air electrode assembly 24 is illustrated, according to one exemplary embodiment. In FIG. 7, a press and cutting (punch) machine 90 is illustrated receiving a sheet 51 of prefabricated air electrode assembly material. Machine 90 has an upper press 100 with a peripheral downward extending press member 102 in a generally prismatic shape aligned with a lower press base 104 having a peripheral upward extending press member 106 aligned with extension 102. Support blocks 108 are provided around the outer edge of base 104. As seen in FIG. 8, the upper press 100 is forcibly moved downward and into contact with the sheet 51 of prefabricated air electrode assembly material so as to compress the sheet 51 between press members 102 and 106 to form compressed regions 28. According to one example, the press 100 may apply a lamination pressure in the range of about 12.7 to 15.5 kg/cm$^2$ (180 to 220 psi). The press members 102 and 106 compress the sheet 51 on top and bottom sides to form the compressed portion 28 according to the exemplary embodiment. According to other embodiments, the compressed portion 28 may be formed in only the top side or the bottom side of the electrode assembly 24. Additionally, the upper press 100 moves downward such that the excess sheet material 53 at the peripheral edges of compressed portion 28 is cut off by the corner of the support block 108 so as to cut the sheet 51 into the desired prismatic shape and size. The air electrode assembly 24 shown in FIGS. 5 and 9 is then ready for insertion into the can 14 during assembly of the electrochemical cell 10.

More than one air electrode assembly 24 can be cut from a single sheet 51 of laminated material. For example the sheet 51 can be in the form of a strip from which a series of electrode assemblies 24 is punched. Adjacent electrode assemblies 24 can have adjoining compressed portions 28, formed by compressing at least a portion of both compressed portions 28 at essentially the same time, such as with a single punch or with a roller.

Figure 10:
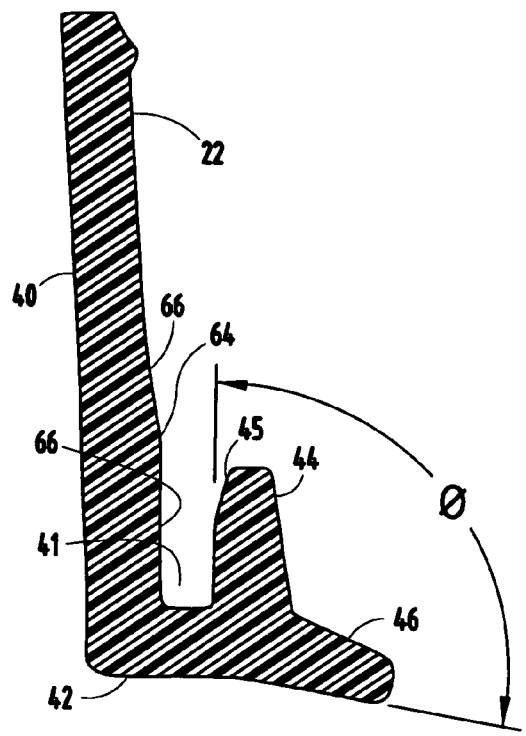
FIG. 10 is an enlarged cross-sectional view of the gasket taken through line X-X of FIG. 3, prior to insertion and compression in the cell housing.

The electrochemical cell 10 advantageously employs an insulating gasket 22 having first and second inner extending walls or extensions 44 and 46 provided on the inside of the crimped closure of housing 12. Referring to FIG. 10, the insulating gasket 22 is illustrated according to one embodiment, prior to insertion in the cell housing 12. As seen, the gasket 22 includes an outer upstanding wall 40, a bottom base wall 42 and the first and second inner extending walls 44 and 46 that form a pair of levers or feet. The first and second inner walls 44 and 46 have terminating ends and are interconnected to the outer upstanding wall 40 by way of the bottom base wall 42. Formed in the outer surface of inner wall 44 near the terminating end is a taper 45 of about fifteen degrees (15°) that allows for enhanced alignment with the cover side wall 20.

The first and second inner extending walls 44 and 46 are formed at an angle Ø greater than ninety degrees (90°) such that the outer surface of inner upstanding wall 44 and the bottom surface of second inner wall 46 are oriented at angle Ø greater than ninety degrees (90°). According to one embodiment, angle Ø is in the range of ninety-five degrees (95°) to one hundred thirty-five degrees (135°), and more particularly about one hundred degrees (100°). The first inner wall 44 is an upstanding wall that is substantially parallel to outer wall 40 such that it engages the inner surface of downward extending wall 20 of the cover 16. Inner wall 44 and outer upstanding wall have a slot 41 provided therebetween for receiving side wall 20 of cover 16. The second inner wall 46 is angled downward from the horizontal by five degrees (5°) to forty-five degrees (45°), and more particularly about ten degrees (10°), such that its bottom surface engages the top surface of the air electrode assembly 24. By forming the first and second inner extending walls 44 and 46 at an angle Ø greater than ninety degrees (90°), the first and second inner walls 44 and 46 of gasket 22 are deflected toward each other when the cell 10 is assembled so as to act as a spring to provide a bias force against the inner surface of downward extending wall 20 of cover 16 and a bias force against the top surface of air electrode assembly 24. This provides for an enhanced robustness sealed closure of the cell housing 12.

The outer upstanding wall 40 of gasket 22 has an inner surface 66, the angle of which changes at location 64, providing an increased thickness at location 64. The change in angle at location 64 enhances the sealed closure and forms a high compression region at location 64. The resulting inner surface 66 of upstanding outer wall 40 has a single change in angle at location 64.

In providing the single change in angle at location 64, there are no tooling marks or inconsistencies associated with the change in the geometry of the inside surface 66 of gasket 22. The outer surface of outer upstanding side wall 40 may have various angles which cause a bulge to form in the sealing zone when the cell housing 12 is crimped closed. Hence, the downward extending side wall 20 of cover 16 may be forced inwards by the pressure of the slightly larger seal in the sealing zone. The wall 20 of cover 16 then acts as a spring which provides continuous force on the gasket 22 even during temperature changes. The top of the cover 16 is stabilized by the remainder of the cover 16 leading to the negative contact surface. The bottom of the cover 16 is stabilized by the base 42 of the gasket 22 which holds the end of the wall 20 of cover 16 in radial position. This results in a cover side wall 20 which is substantially held at both ends with a force applied to the middle of the cover 16 (i.e., at the sealing zone). The resulting spring loaded sealing members are desired since they provide continuous pressure on sealing surfaces during temperature changes. Hence, the shelf leakproofness of the battery cell 10 can be improved. Further, if the battery cell 10 is pressurized, such as during internal gassing, the pressure acts on the inner cover side wall 20, thus increasing the compression on the gasket 22 such that the gasket 22 effectively becomes self-sealing.

Figure 11:
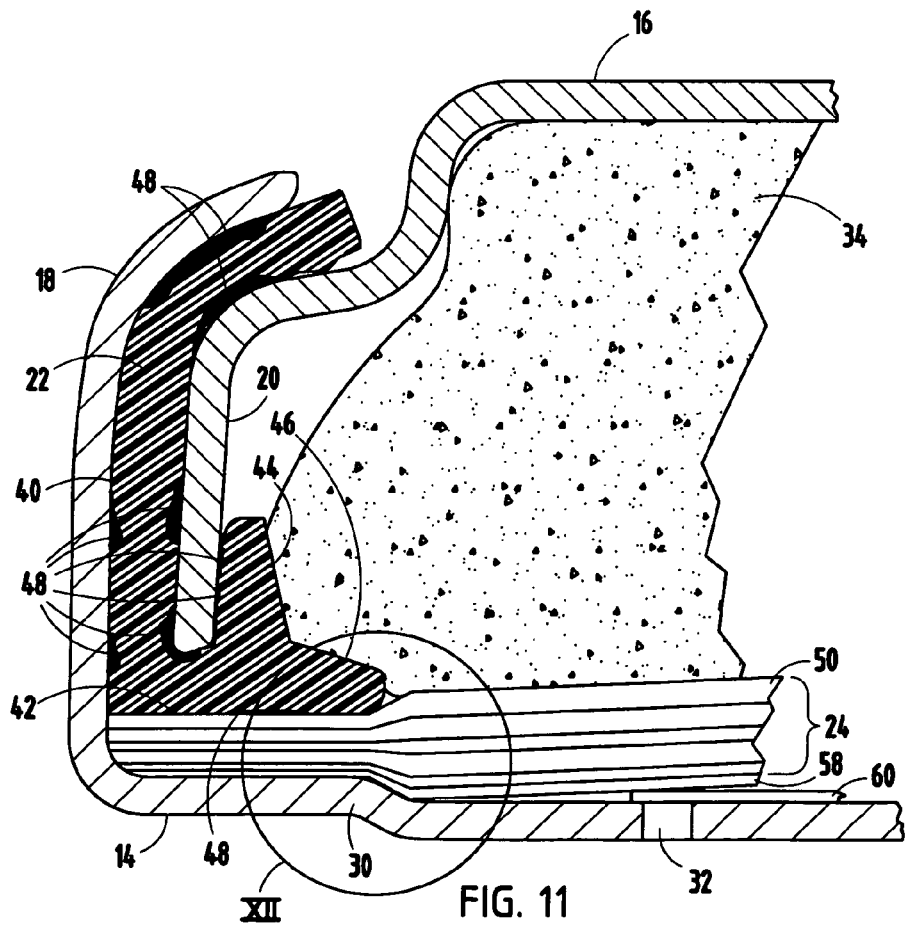
FIG. 11 is a cross-sectional view of the prismatic battery further illustrating high compression regions of the gasket, according to one embodiment.

As seen in FIG. 11, the compressed gasket 22 produces high compression sealing zones 48, including a sealing zone in the middle of the side wall in the vicinity of location 64, as well as at the outer surface of first inner extending wall 44 and bottom surface of second inner extending wall 46. Both radial and axial sealing zones are established, particularly at the high compression sealing zones 48. The multiple sealing regions of high compression zones 48 make the leakage path more tortuous and lessen the sensitivity of the main sealing zone to manufacturing errors.

In one example, a PR48 battery cell may employ a can side wall 18 angled increased to about 3.7 degrees. Thus, when the battery cell 10 is redrawn in a collet, the can side wall 18 is straightened. The interference between the inside diameter of the can 14 and the outside diameter of gasket 22 is increased from a clearance to a slight interference.

Figure 12:
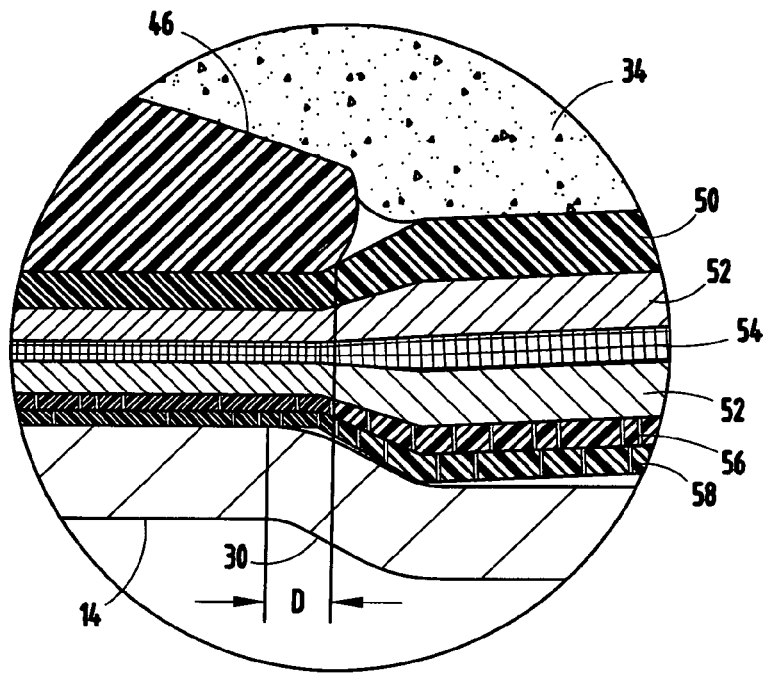
FIG. 12 is an enlarged view of section XII shown in FIG. 11.

Referring to FIGS. 11 and 12, the second inner extending wall 46 is illustrated in relation to the bottom wall of can 14, particularly the inner surface of the angled transition 30 between the peripheral and central recessed portions of the bottom wall. According to one embodiment, the distance D, between the radially outermost point of the transition 30 and the radially innermost point of contact between the second inner extending wall 46 and the air electrode assembly 24 (FIG. 12), is greater than 0.127 millimeter (0.005 inch, and more particularly about 0.2032 millimeter (0.008 inch). The inner surface of transition 30 in the can bottom preferably extends upward and outward from the central recessed area at an angle greater than 15 degrees from horizontal (with the cell oriented as shown in FIG. 11). The transition 30 in can bottom may include a substantially straight ramp, a sudden (e.g., vertical) step, or other configuration that provides a recess into which the central portion of electrode assembly 24 may be forced by the end of the first inner extension 46 of gasket 22.

By providing the second inner extending wall 46 of gasket 22 extending radially inward beyond the radially outermost point on the inside surface of transition 30, the second inner extending wall 46 essentially forces the electrode assembly 24 downward so as to reduce the amount of doming of the electrode assembly 24 that may otherwise occur. Thus, the second inner extending wall 46 of gasket 22 essentially compresses the air electrode assembly 24 downward to cause a lever effect which forces assembly 24 downward into the recessed can 14 and opposes electrode doming. By contouring the outer perimeter of the can 14, the lever effect can be generated on the air electrode assembly 24 in the downward direction.

In general, the higher the force applied to pre-compress the electrode assembly (the pre-compression force) the better, as long as the components of the electrode assembly 24 are not damaged, and the pre-compression force will generally be equal to or greater than the force applied to the electrode assembly 24 during cell closing.

Preferably the pre-compressed portion 28 of the air electrode assembly 24 will be compressed to a thickness no greater than 85 percent, more preferably no greater than 80 percent, and most preferably no greater than 75 percent of the thickness of the central, non-pre-compressed portion 26. To avoid damaging the electrode assembly, the thickness of the pre-compressed portion 28 will compressed to a thickness no less than 70 percent of the thickness of the non-compressed portion 26.

As a result of pre-compression, the spring-back characteristic of the pre-compressed portion 28 after the cell 10 is closed is reduced. Computer modeling has predicted reductions in spring-back ranging from an average of about 27 to nearly 100 percent, depending on the size of the electrode. In general, the larger the electrode the greater the effect of pre-compression. Preferably, the pre-compression is such that, for an electrode having a width of about 15 mm or greater, the pre-compressed portion 28 will not increase in thickness by an average of more than about 12 percent if the electrode assembly 24 is removed from the sealed cell 10, as can be determined by cross-sectioning the sealed cell 10 and measuring the thickness of the pre-compressed portion 28 before and after removing the electrode assembly 24 from the cross-sectioned cell. More preferably the average thickness increase will be no greater than 10 percent and most preferably no greater than about 5 percent.

While the electrode assembly 24 can be pre-compressed before, during or after it is cut or punched from a larger sheet 51 of laminated electrode assembly stock, it can be advantageous to pre-compress the peripheral portions of adjacent electrode assemblies 24 before they are cut into individual electrode assemblies 24. By so doing, lateral flow of air electrode mix 52 can be minimized to improve its packing during pre-compression and to prevent extrusion of mix from the edges of the cut electrode assemblies 24 during pre-compression.

As an alternative to pre-compressing the peripheral portion of the electrode assembly 24, prior to its insertion into the can, the electrode assembly 24 can be compressed before the gasket 22 and cover 16 are assembled with the can 14. For example, the electrode assembly 24 can be inserted into the can and a compressive force applied to the peripheral portion of the electrode assembly 24, using a rigid punch for example. It may be desirable to use a punch with an electrode assembly contacting surface having a shape similar to the shape of the adjacent portion of the can bottom in order to avoid damaging the electrode assembly 24 during the compression step. It is also desirable to avoid extruding cathode mix 52 from the edges of the electrode assembly 24 during this compression step. After the electrode assembly 24 is compressed, the gasket 22 and cover 16 containing the anode 34 are combined with the can 14, and the top portion of the can side wall 18 is bent inward and downward to seal the housing 12.

Pre-compression of the electrode assembly 24 before insertion into the can and compression after insertion and before combining the can 14, gasket 22 and cover 16 can be done to the electrode assembly 24 alone or to the electrode assembly 24 together with other cell components, such as microporous layer 58. Including microporous layer 58 with the electrode assembly 24 during compression before cell closing can advantageously reduce improve the sealing characteristics of the microporous layer 58 as well.

Compression of the seal-forming portion of the electrode assembly can provide a more robust seal in prismatic and button shaped fluid consuming cells such as those described above. It is also contemplated that similar compression of the electrode assembly can provide a good seal in fluid consuming cells of other shapes as well, such as cylindrical cells, including cylindrical cells with an electrode assembly disposed in one or both ends of the cell or disposed adjacent to the cylindrical side wall of the cell.

Figure 13:
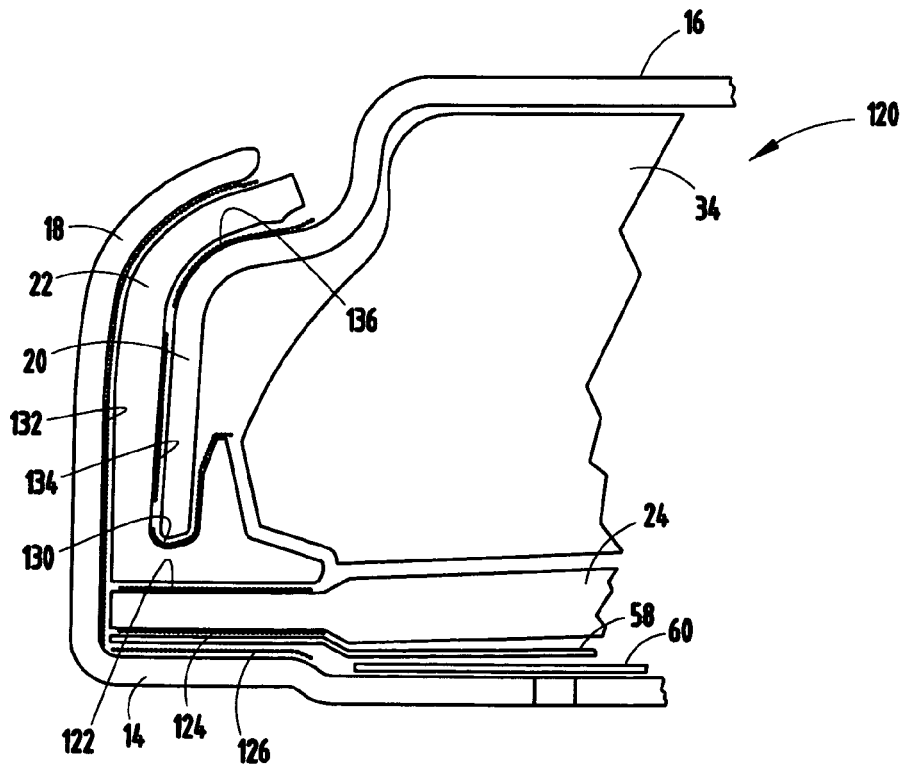
FIG. 13 is an exploded cross-sectional view of a battery further illustrating application of sealants on various surfaces, according to one embodiment.

Referring to FIG. 13, a zinc air cell battery 120 (an embodiment of battery cell 10) is generally illustrated employing sealants 122-136 on various surfaces. The electrochemical cell 120 employs sealants applied during cell assembly at one or more of various locations within the cell 120. The sealant locations can include a sealant 122 applied on top of the compressed region 28 of the air electrode assembly 24 such that the sealant 122 is provided at the interface of the air electrode assembly 24 and the bottom surface of the base wall 42 of gasket 22. A sealant 124 can be applied between the peripheral portions of air electrode 52 and a loose layer of microporous material 56 of electrode assembly 24. A sealant 126 can be disposed between peripheral portions of the loose layer of microporous material 56 and the bottom of can 14. A sealant 130 can be disposed between the first inner extension 44 of gasket 22 and the inner surface of downward extending wall 20 of cover 16. A sealant 132 can be is disposed on the inside surface of the upper extending wall 18 of can 14 which interfaces with the upstanding outer wall 40 of gasket 22. A sealant 134 can be disposed on the inside surface of the upstanding wall 40 of gasket 22 which interfaces with the downward extending wall 20 of cover 16. Further, a sealant 136 can be disposed on the shoulder of the wall 20 of cover 16 which interfaces with the upper inner surface of upstanding outer wall 40 of gasket 22.

The various sealants 122 through 136 may include known sealants such as asphalt or a polyamide hot melt adhesive, according to some examples. Various solvents, such as trichloroethylene, isopropyl alcohol, naphtha, as well as other known solvents, can be mixed with the sealants to facilitate sealant application. The weight loading of the sealants 122 through 136 in the mixtures may be selected between five percent (5%) and thirty percent (30%), according to one embodiment. The various sealants 122 through 136 may be applied using application methods for sealants as are known in the art such as sprays, droplets, hot-melt dispensing, etc., Neutralizing agents, such as boric acid, citric acid, acetic acid, and others can be used to neutralize any potassium hydroxide leakage. By applying sealants 122 through 136 in the various locations, dip-coating of the gasket 22 may not be necessary. This may result in reduced manufacturing problems such as sticking gaskets. While sealants 122 through 136 are shown in the example, it should be appreciated that sealants 122 and 136 may not be required in all of the locations to provide a robustly sealed closure to the cell 120.

Accordingly, the battery cell 10 of the present invention advantageously provides for a robust sealed closure which minimizes electrolyte leakage and doming of the air electrode assembly 24. The teachings of the present invention may be applicable to battery cells configured in various shapes and sizes including prismatic, cylindrical, disk shapes and other shapes.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A battery comprising:
a cell housing comprising a first housing component and a second housing component, said housing having at least one fluid entry port through the cell housing for the passage of a fluid into the cell housing;
a first electrode disposed within the cell housing in electrical contact with the first housing component;
an electrode assembly comprising a second, fluid consuming electrode disposed within the cell housing in electrical contact with the second housing component; and
a gasket disposed between the first and second housing components, said gasket comprising an outer upstanding wall, a base wall, and first and second inner extensions extending such that the first inner extension is in biased contact with the first housing component and the second inner extension is in biased contact with the electrode assembly, and the first and second inner extensions in a non-deflected state generally extend at an angle in the range of ninety-five to one hundred thirty-five degrees (95° to 135°) relative to each other.

2. The battery as defined in claim 1, wherein the first and second inner extensions in a non-deflected state generally extend at an angle greater than 90 degrees relative to each other.

3. The battery as defined in claim 1, wherein the first inner extension of the gasket is compressed against an inside surface of the first housing component, and the second inner extension of the gasket is compressed against the electrode assembly.

4. The battery as defined in claim 1 further comprising a separator disposed between the first and second electrodes.

5. A battery comprising:
a cell housing comprising a first housing component and a second housing component, said housing having at least one fluid entry port through the cell housing for the passage of a fluid into the cell housing;
a first electrode disposed within the cell housing in electrical contact with the first housing component;
an electrode assembly comprising a second, fluid consuming electrode disposed within the cell housing in electrical contact with the second housing component; and
a gasket disposed between the first and second housing components, said gasket comprising an outer upstanding wall, a base wall, and first and second inner walls extending such that the first inner wall is in biased contact with the first housing component and the second inner wall is in biased contact with the electrode assembly, and the first and second inner walls in a non-deflected state generally extend at an angle in the range of ninety-five to one hundred thirty-five degrees (95° to 135°) relative to each other, wherein the second housing component comprises a bottom wall with a central outward recess and a transition between the central recess and a peripheral portion, and wherein the second inner wall has a surface extending radially inward from a radially outermost point of the transition such that the electrode assembly is biased toward the recess in the second housing component.

6. The battery as defined in claim 5, wherein the second inner wall surface extends radially inward of the radially outermost point of the transition by a distance greater than 0.127 millimeter.

7. The battery as defined in claim 5, wherein the transition comprises an outward angled surface extending from the recess to the peripheral portion of the second housing component bottom wall.

8. The battery as defined in claim 1, wherein each of the first and second inner extensions has a terminal end.

9. The battery as defined in claim 1, wherein the gasket comprises a change in thickness of the outer upstanding wall which provides a high compression region between the first and second housing members.

10. The battery as defined in claim 1, wherein one of the first and second housing members is crimped toward the other housing member to compress the gasket to form a sealed closure.

11. The battery as defined in claim 9, wherein the electrode assembly further comprises a pre-compressed portion formed in the vicinity of the crimped closure.

12. A battery comprising:
a cell housing comprising a first housing component and a second housing component, said housing having at least one fluid entry port through the cell housing for the passage of a fluid into the cell housing;
a first electrode disposed within the cell housing in electrical contact with the first housing component;
an electrode assembly comprising a second air electrode disposed within the cell housing in electrical contact with the second housing component; and
a gasket disposed between the first and second housing components, said gasket comprising an outer upstanding wall, a base wall, and first and second inner extensions extending from the base wall and having terminal ends, wherein the first and second inner extensions are compressed such that the first inner extension is in biased contact with the first housing component and the second inner extension is in biased contact with the electrode assembly, and the first and second inner extensions in a non-deflected state generally extend at an angle in the range of ninety-five to one hundred thirty-five degrees (95° to 135°) relative to each other.

13. The battery as defined in claim 12, wherein the first and second inner extensions in a non-compressed state generally extend at an angle greater than 90 degrees relative to each other.

14. The battery as defined in claim 12, wherein the first inner extension is compressed against an inside surface of the first housing component, and the second inner extension is compressed against the electrode assembly.

15. The battery as defined in claim 12 further comprising a separator disposed between the first and second electrodes.

16. A battery comprising:

a cell housing comprising a first housing component and a second housing component, said housing having at least one fluid entry port through the cell housing for the passage of a fluid into the cell housing;

a first electrode disposed within the cell housing in electrical contact with the first housing component;

an electrode assembly comprising a second air electrode disposed within the cell housing in electrical contact with the second housing component; and a gasket disposed between the first and second housing components, said gasket comprising an outer upstanding wall, a base wall, and first and second inner walls extending from the base wall and having terminal ends, wherein the first and second inner extending walls are compressed such that the first inner wall is in biased contact with the first housing component and the second inner wall is in biased contact with the electrode assembly, and the first and second inner walls in a non-deflected state generally extend at an angle in the range of ninety-five to one hundred thirty-five degrees (95° to 135°) relative to each other, wherein the second housing component comprises a bottom wall with a central outward recess and a transition between the central recess and a peripheral portion, and wherein the second inner wall has a surface extending radially inward from a radially outermost point of the transition such that the electrode assembly is biased toward the recess in the second housing component.

17. The battery as defined in claim 16, wherein the second inner wall surface extends radially inward of the radially outermost point of the transition by a distance greater than 0.127 millimeter.

18. The battery as defined in claim 16, wherein the transition comprises an outward angled surface extending from the recess to the peripheral portion of the second housing component bottom wall.

19. The battery as defined in claim 12, wherein the gasket comprises a change in thickness of the outer upstanding wall which provides a high compression region between the first and second housing members.

20. The battery as defined in claim 12, wherein one of the first and second housing members is crimped toward the other housing member to compress the gasket to form a sealed closure.

21. The battery as defined in claim 12, wherein the electrode assembly further comprises a pre-compressed portion formed in the vicinity of the crimped closure.

* * * * *